United States Patent [19]

Prince

[11] Patent Number: 5,581,484
[45] Date of Patent: Dec. 3, 1996

[54] FINGER MOUNTED COMPUTER INPUT DEVICE

[76] Inventor: Kevin R. Prince, 28260 Via Marcus, Laguna Niguel, Calif. 92656

[21] Appl. No.: 266,022

[22] Filed: Jun. 27, 1994

[51] Int. Cl.$^6$ ............................. G06F 3/00; H03M 11/00
[52] U.S. Cl. ..................... 364/559; 340/407.1; 341/22; 345/173; 84/600
[58] Field of Search ...................... 364/513.5, 559, 364/512, 464.01, 709.1; 395/99; 341/20, 22; 294/88, 907; 84/600; 273/198 B; 340/709, 725, 365, 407.1, 407.2; 381/36; 128/774, 782; 178/18, 19, 17 C; 345/173

[56] References Cited

U.S. PATENT DOCUMENTS

| | | | |
|---|---|---|---|
| 3,507,376 | 4/1970 | Kafafian | 197/19 |
| 3,831,296 | 8/1974 | Hagle | 35/35 A |
| 4,414,537 | 11/1983 | Grimes | 340/365 R |
| 4,586,387 | 5/1986 | Morgan et al. | 73/862.05 |
| 4,613,139 | 9/1986 | Robinson, II | 273/148 B |
| 4,777,328 | 11/1988 | Talmage, Jr. et al. | 178/18 |
| 4,783,107 | 11/1988 | Parker et al. | 294/88 |
| 4,878,843 | 11/1989 | Kuch | 434/112 |
| 4,905,001 | 2/1990 | Penner | 341/20 |
| 4,922,060 | 5/1990 | McJunkin | 178/18 |
| 4,988,981 | 1/1991 | Zimmerman et al. | 340/709 |
| 5,047,952 | 9/1991 | Kramer et al. | 364/513.5 |
| 5,119,709 | 6/1992 | Suzuki et al. | 84/600 |
| 5,184,009 | 2/1993 | Wright et al. | 250/227.11 |
| 5,212,372 | 5/1993 | Quick et al. | 235/472 |
| 5,250,929 | 11/1993 | Hoffman et al. | 345/146 |
| 5,290,964 | 3/1994 | Hiyoshi et al. | 84/600 |
| 5,341,133 | 8/1994 | Savoy et al. | 341/22 |
| 5,444,192 | 8/1995 | Shetye et al. | 178/18 |
| 5,453,571 | 9/1995 | Adachi et al. | 84/658 |
| 5,486,112 | 1/1996 | Troudet et al. | 434/250 |

OTHER PUBLICATIONS

Son et la., "A tactile sensor for localizing transient events in manipulation", IEEE May 8, 1994.

*Primary Examiner*—Emanuel T. Voeltz
*Assistant Examiner*—K. Shah
*Attorney, Agent, or Firm*—Curtis L. Harrington

[57] ABSTRACT

An apparatus is provided for manually entering information into a computer. A pressure sensor is removably attached proximate to the tip of at least one, but preferably all, of the fingers of a hand for generating a pressure signal that corresponds to the pressure of the finger tip against a surface, such as a desk top or table top. First and second acceleration sensors are also removably attached proximate to the finger tip for generating a first and second acceleration signal that is a function of the acceleration of the finger tip in first and second directions, respectively. The first direction is different, and preferably orthogonal, to the second direction. Preferably the sensors are mounted in a flexible, removable fabric glove, or the like. A signal relay device, either wire-based or wireless, relays the signals of each sensor to the computer, which calculates from the signals the relative positions of each finger on the surface for generating keyboard, mouse, graphics tablet, or other forms of input data.

16 Claims, 10 Drawing Sheets

FINGER MOUNTED COMPUTER INPUT DEVICE

FIELD OF THE INVENTION

This invention relates generally to computer interface devices, and, more particularly, is directed toward such a device having sensors for determining finger pressure against a surface and finger position over the surface.

BACKGROUND OF THE INVENTION

One of the most important factors contributing to the effective use of a computer is the interface between the computer and a person using it. Unquestionably the most popular computer interface device is the keyboard, which has a plurality of depressable keys each corresponding to a particular alphanumeric character, symbol, or computer function. While computer keyboards are widely accepted and quite suitable in many situations, keyboards are not always the most efficient, convenient, or easy to use devices.

For example, on a typical desktop the most commonly used space is that space closest to the edge near the user who is sitting at the desk. Computer keyboards must occupy a considerable amount of this space on the desktop in order to remain within easy reach of the user. However, with a computer keyboard occupying this space, very little space is left to spread-out papers, write by hand, or the like. To overcome this drawback there are several keyboard holders that slide out of the way when the user is not using the keyboard. But such devices make it difficult to slide the keyboard back out into a useful position if the immediate workspace has since been occupied by papers, a coffee cup, or the like. Such devices are somewhat cumbersome to use.

Another drawback of computer keyboards is that they include up to 110 individually marked keys mounted to a base with as many switches. All of these components must be produced and assembled, which accounts for considerable expense. Keyboards are relatively expensive to manufacture, and since they are mechanical, are also more prone to failure than solid state devices. Further, the conventional keyboard cannot be quickly changed to a new keyboard layout, such as might be desired by those who have learned a keyboard layout other than the somewhat inefficient but traditional QWERTY layout.

Still another drawback of computer keyboards is that they are built generally in one size for all users. As a result, users with relatively small or large hands must adapt to a keyboard size that is not optimal for their particular hand size. A person with smaller hands must stretch further to strike a key some distance from a home row of keys, whereas a person with larger hands will have a harder time accurately striking any desired key. Keyboard size that is optimized for a particular use may lead to decreased hand fatigue. However, keyboard manufacturers have determined an ergonomically acceptable compromise, which is a compromise nevertheless.

Still another drawback of the conventional computer keyboard is that it requires the user to type with his hands close together in an unnatural manner. It has been found that so called "split" keyboards, which are split into a separate keyboard for each hand, are more comfortable for the user and produce a slightly faster typing speed as a result. However, such keyboards are generally more expensive and as such have not gained widespread popularity.

Many pocket-sized and portable computers are available with miniature keyboards. Typing on these miniature keyboards using proper typing form is nearly impossible, especially for people with average or large sized hands. As such, keyboards have, to a large extent, determined the smallest usable size for small and portable personal computers. As computers become smaller and smaller, keyboards, it would appear, must be abandoned for pen or stylus based input screens that recognize the user's handwriting or printing. However, many people can type much faster than they can write by hand, so such stylus-based input screens are often not preferable to a conventionally sized keyboard, even if a smaller computer is more portable and convenient.

Pointing devices, such as "mouse" pointing devices and so called "track ball" devices are also popular computer interfaces. Generally, these types of devices provide velocity information, in both an X direction and an orthogonal Y direction, to the computer, as well as signals from one or more momentary contact push buttons. A pointing icon or other "tool" on a computer monitor responds to such velocity input by corresponding X and Y movement on the computer monitor. Graphics tablets are another type of "pointing" input device that provide the computer with X and Y positional information, as opposed to velocity information, which is used in much the same manner by the computer. Such devices are well suited for pointing to various software "push button" options on the screen, selecting portions of text or a group of software "objects," freehand on-screen drawing, positioning a typing cursor location, and similar functions. However, such pointing devices are remarkably ill-suited for text data input.

Another type of computer interface device which is not yet in widespread use is a voice-activated interface device. In such a device, spoken commands and data are interpreted by the computer. The hardware required for such a device is relatively simple, typically just a microphone and an interface circuit. Microphones take very little space, and thus free-up a considerable amount of desk space. However, such an input device is not well suited for pointing operations, and therefore a mouse or other pointing device is still typically necessary. Further, such devices currently are somewhat frustrating to use since they require sophisticated interpretive software that, as of yet, does not always accurately interpret spoken words. While the accurate interpretation of spoken words by computers is imminent, one does not always wish to vocalize the data being entered into the computer. For instance, often people enter sensitive and private information into their computer while speaking to a customer or client on the phone, or with other people nearby. Moreover, with many people speaking to their computers in the same room, a high level of noise results. In a library or other relatively quiet environment, vocalizing information to a computer is inappropriate and undesirable.

Other types of computer interfaces have been developed to overcome some of the above mentioned drawbacks. For example, U.S. Pat. No. 5,212,372 to Quick et al. on May 18, 1993, teaches a glove device that has sensors for measuring the curvature of each finger at joints thereof. For entering numerical data, a person using this type of device curves his fingers to point to "zones," or virtual keys, that each represent a particular number. While the input of alphabetical data is mentioned in the Quick disclosure, only numerical zones are illustrated and it remains unclear how such a device could possibly be used to enter the twenty-six additional characters of the alphabet, especially since the little finger is used solely for designating an "enter" key and is therefore not available for pointing to alphanumeric zones.

A variety of similar glove-based prior art devices exist, and in most cases each uses some type of joint flexing sensor to determine finger curvature. Many such devices are designed for communication with deaf or otherwise challenged individuals, and typically provide for computer interpretation of alphanumeric data formed by a single hand with standard sign language. It is a slow and fatiguing process for people, even those fluent in sign language, to use such devices to enter a large amount of data into a computer, such as might be required while typing a patent disclosure, for example. Further, while finger curvature is relatively easy to detect in a variety of sophisticated ways, such detection is only accomplished in one dimension. Lateral movement of the finger, for example from the "J" key to the "H" key of a standard QWERTY keyboard, cannot be detected by such joint flexure sensors as disclosed in the prior art. This drawback is also evident in many "virtual reality" data manipulation gloves, which also include a variety of motion sensors on similar gloves. As a result, such devices have limited use and are not well suited for prolonged data entry from a wide selection of character and command keys, such as those found on the standard computer keyboard.

It is clear, then, given the above drawbacks associated with current man to computer interface devices, that a device that overcomes these drawbacks is strongly needed. Such a needed device would be adaptable to any individual, regardless of hand size or typing style. Further, such a needed device could be used equally well for both alphanumeric data entry, command entry, and X,Y pointer input. Still further, such a needed device would take up no additional space on a person's desktop, could be used over papers on a desk, and could be easily used with computers of any physical size. Indeed, a needed device of this type would be as portable as the smallest pocketbook computers, and would not require the user's hands to be held close together as with the conventional keyboard. Such a needed device would be to a large extent software re-configurable, making use of the device immensely flexible and adaptable. The present invention fulfills these needs and provides further related advantages.

SUMMARY OF THE INVENTION

The present invention is a device for manually entering information into a computer. A pressure sensor is removably attached proximate to the tip of at least one, but preferably all, of the fingers of a hand for generating a pressure signal that corresponds to the pressure of the finger tip against a surface, such as a desk top or table top. First and second acceleration sensors are also removably attached proximate to the finger tip for generating a first and second acceleration signal that is a function of the acceleration of the finger tip in first and second directions, respectively. The first direction is different, and preferably orthogonal, to the second direction. Preferably the sensors are mounted in a flexible, removable fabric glove, or the like. A signal relay device, either wire-based or wireless, relays the signals of each sensor to the computer, which calculates the relative positions of each finger on the surface for generating keyboard, mouse, graphics tablet, or other forms of input data.

The present invention adapts to any hand size or typing style. Further, the present device may be used equally well for both alphanumeric data entry, command entry, and X,Y pointer input. Still further, the present device requires no additional space on a person's desktop or work surface, and can be easily used with computers of any size, even the smallest pocketbook computers. The present device does not require the user's hands to be held close together as with the conventional keyboard, although the user may hold his hands close together if desired. The present device, further, may be manufactured relatively inexpensively. The software in the computer that interprets and calculates the signal data can be as flexible, as adaptive, and as predictive as necessary, making the device extremely versatile and quickly reconfigurable. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
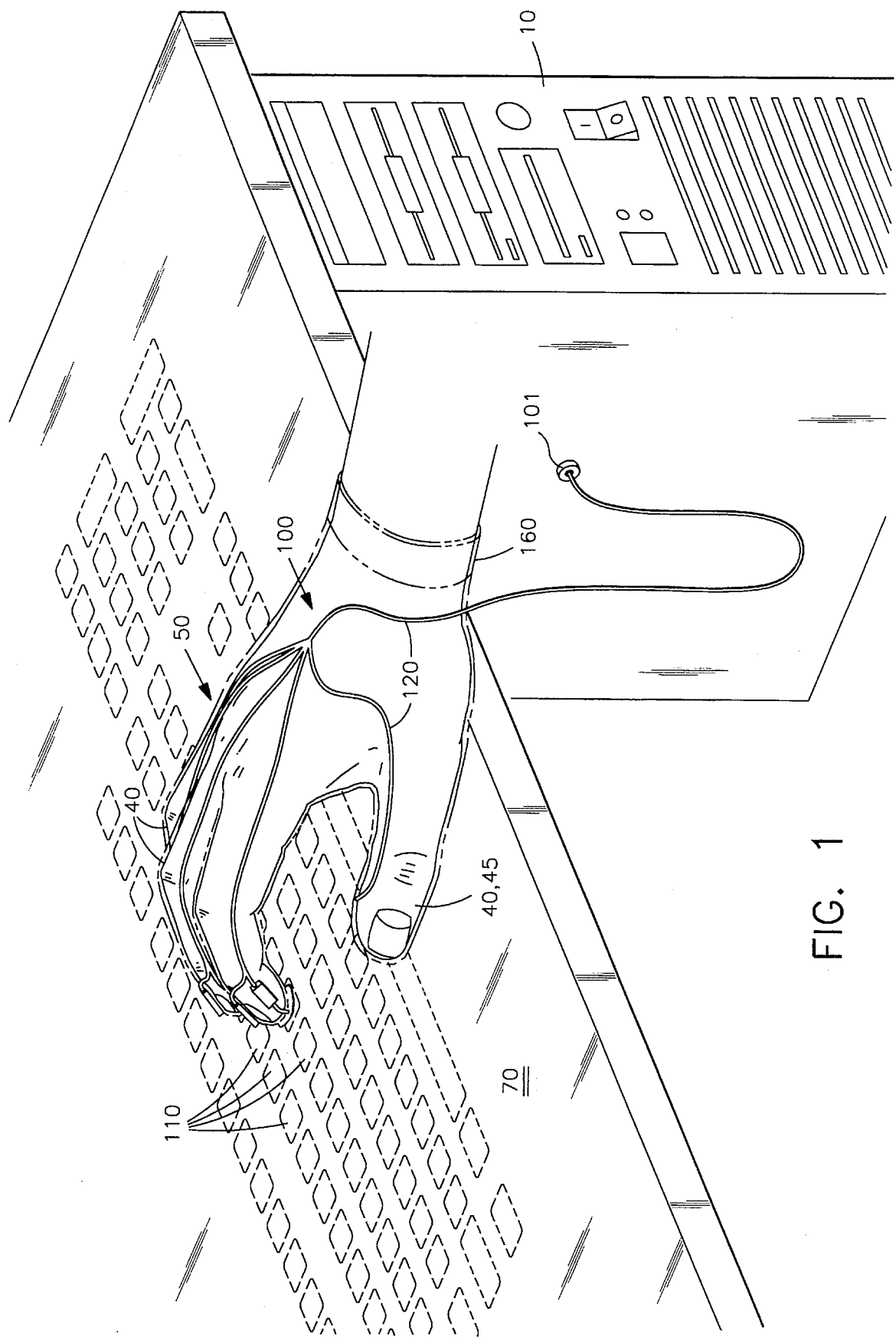
FIG. 1 is a perspective view of the invention, illustrating pressure and acceleration sensors mounted to the fingertip portions of a glove on a user's hand and interconnected to a computer.
Figure 2:
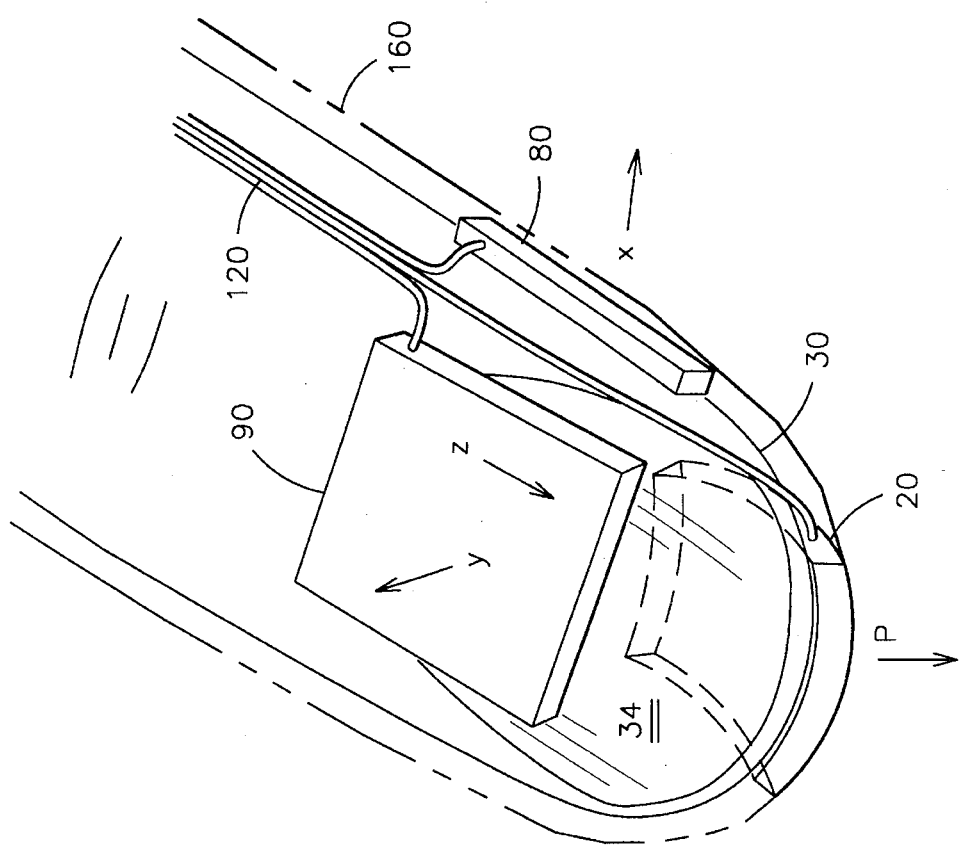
FIG. 2 is a partial perspective illustration of the invention, illustrating an embodiment wherein the acceleration and pressure sensors are separately mounted near the user's fingertip.
Figure 4:
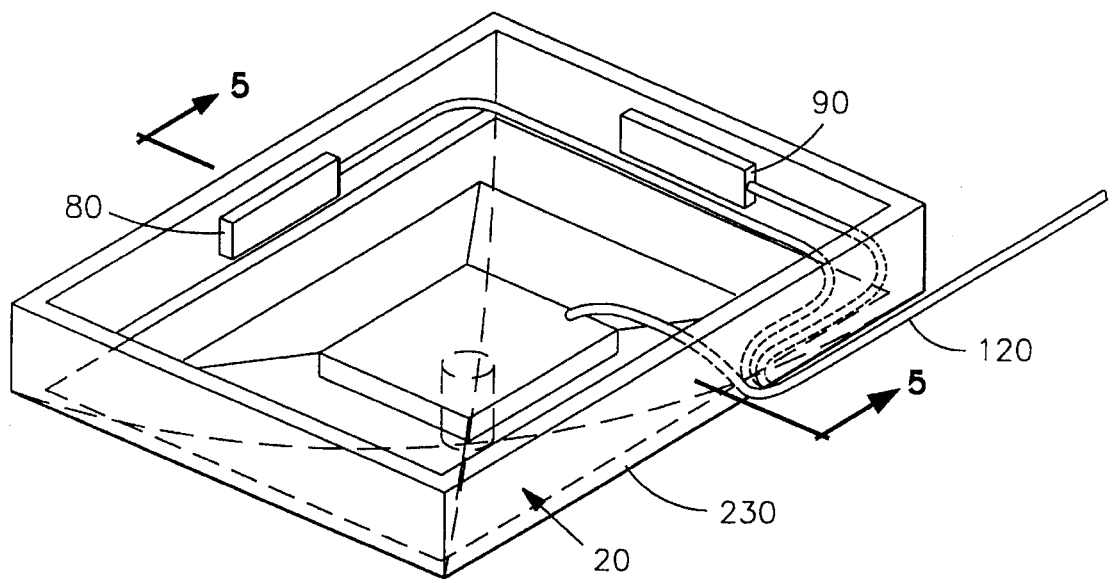
FIG. 4 is a perspective illustration of the sensor housing of FIG. 3, partially broken away to reveal each of the acceleration sensors and the pressure sensor.
Figure 5:
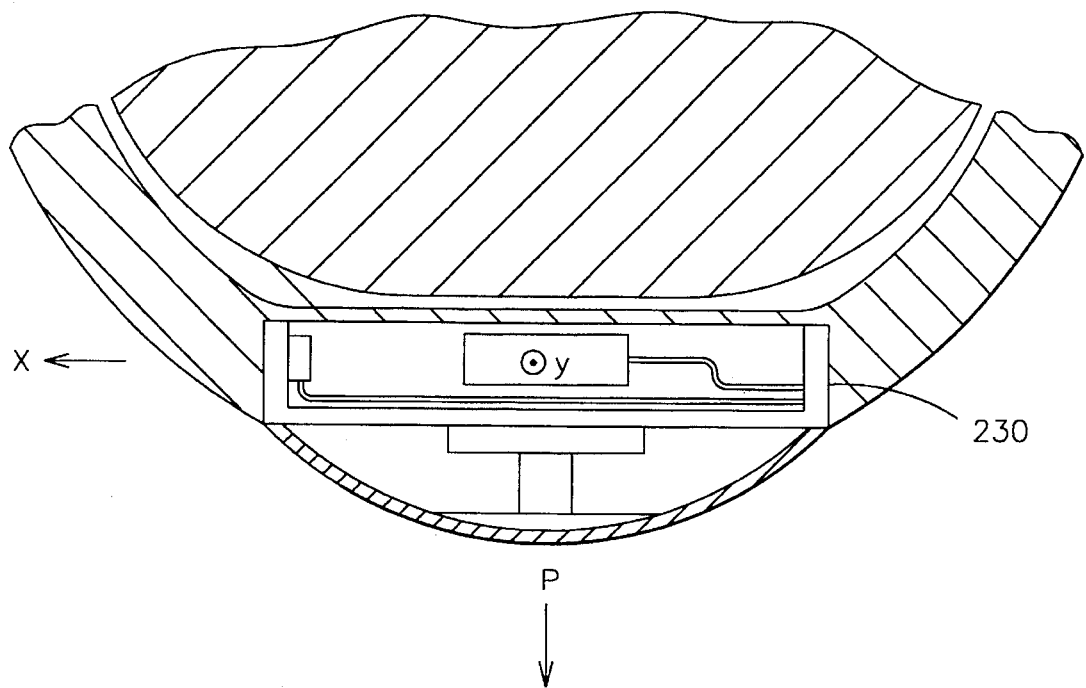
FIG. 5 is a cross-sectional view of the invention, taken generally along lines 5—5 of FIG. 4, and further illustrating the sensor housing as attached to the finger portion of the glove.

FIGS. 1 and 2 show a transducer apparatus for manually entering information into a computer 10. A pressure sensing means 20 is removably attached proximate to the tip 30 of a finger 40 of a hand 50. The pressure sensing means 20 generates a pressure signal P corresponding to the pressure of the finger tip 30 against a surface 70. Such a pressure sensing means 20 may be any of several commonly available pressure sensors, such as solid-state silicon-based pressure sensing strain gauge devices, piezoelectric crystal pressure sensors, dynamic resistance devices, optical pressures sensors, and like sensors. Preferably, such a pressure sensing means 20 is inexpensive, since at least ten may be used with each device. Clearly various types of new pressure sensing means 20 may be developed that are suitable for use with the present invention, and may be used without changing the scope or spirit of the present invention. Such a pressure sensing means 20 may further include a detent means (not shown) for providing positive tactile feedback when the pressure of the finger tip 30 against the surface 70 exceeds a predetermined level.

A first acceleration sensing means 80 is removably attached proximate to the finger tip 30 for generating a first acceleration signal Ax that is a function of the acceleration of the finger tip 30 in a first direction x along a first axis. A second acceleration sensing means 90 is removably attached proximate to the finger tip 30 for generating a second acceleration signal Ay that is a function of the acceleration of the finger tip 30 in a second direction y along a second axis. The second direction y is different than the first direction x and is preferably orthogonal to the first direction x. Each acceleration sensing means 80 may be of various types of accelerometers known in the industry, such as silicon strain gauge single-axis type accelerometers, mercury resistor type accelerometers, piezoelectric based acceleration sensors, optical-based acceleration sensors, and like sensors. Preferably, such an acceleration sensing means 80 is inexpensive, since at least sixteen such sensors 80 may be used with each device, that is, two such sensors 80 for each finger 40 not including the thumbs 45. Clearly various types of new acceleration sensing means 80 may be developed that are suitable for use with the present invention, and may be used without changing the scope or spirit of the present invention.

A multiple axis accelerometer device may be used simultaneously as both the first and second acceleration means 80,90 combined into a single position sensor 230. In such an embodiment, one axis of the multiple axis accelerometer may serve as the first acceleration sensing means 80, while the other axes together may serve as the second acceleration sensing means 90.

Figure 3:
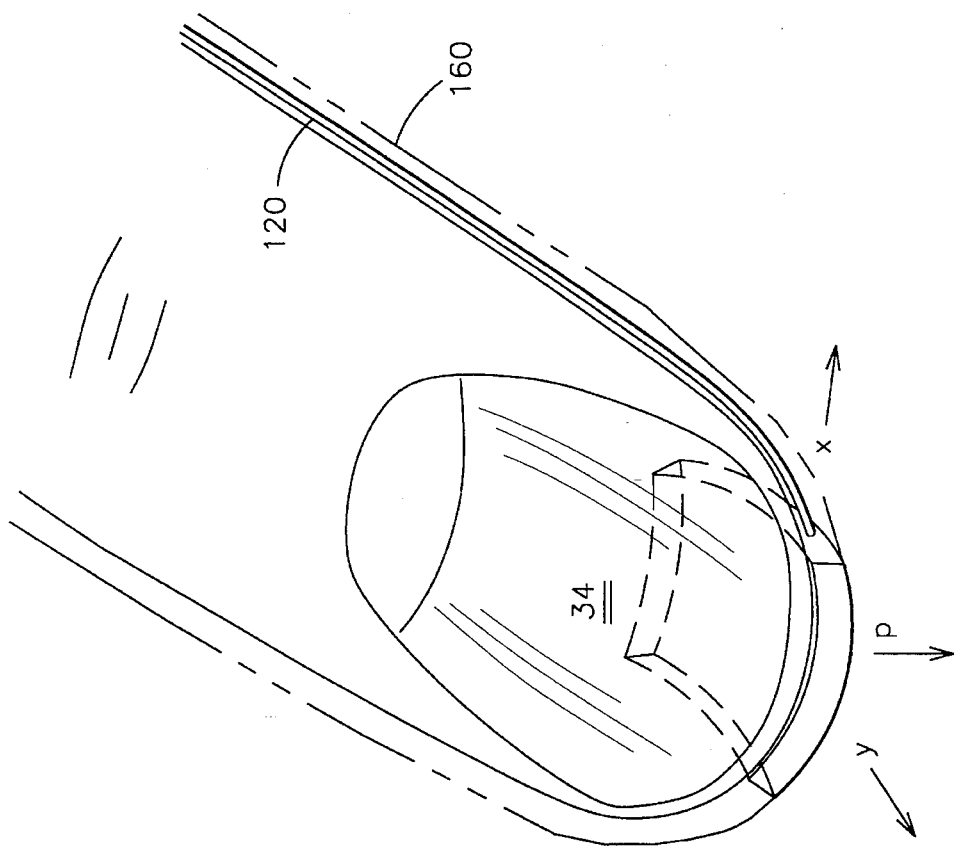
FIG. 3 is a partial perspective illustration of the invention, illustrating an embodiment wherein the acceleration and pressure sensors are housed in a single finger sensor housing that is mounted near the user's fingertip.

In order to clarify the following discussion of finger positioning, assume that the finger nail of each finger 40 roughly defines a finger nail plane 34 (FIG. 3). Further, each finger 40 has a finger axis 36 defined approximately by the longitudinal axis of the distal phalanx of each finger 40 (FIG. 8).

Figure 8:
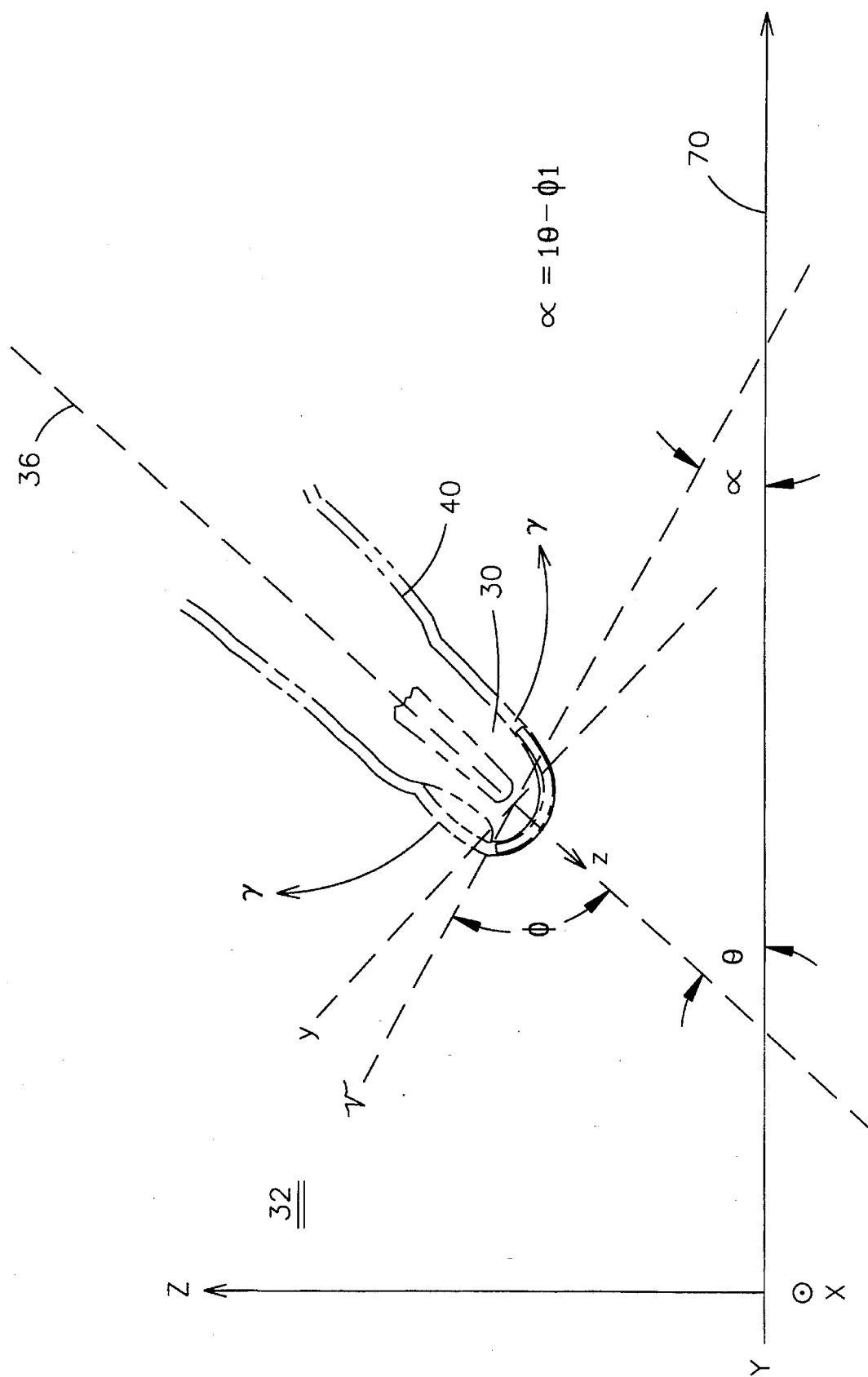
FIG. 8 is a left side elevational view of the finger, illustrating axes of motion of the finger and angles therebetween.
Figure 10:
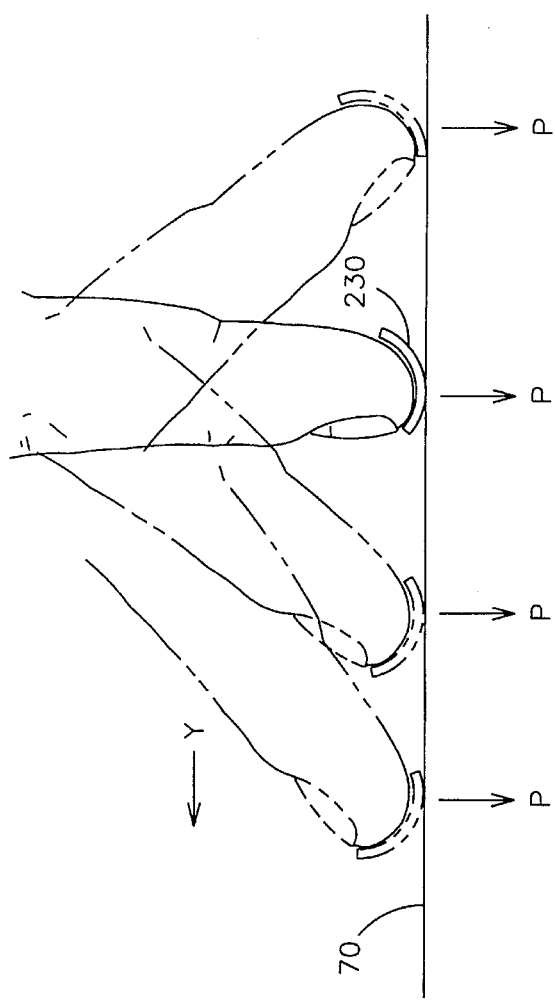
FIG. 10 is a left side elevational view of the finger, illustrating a plurality of finger positions in a Y direction.
Figure 9:
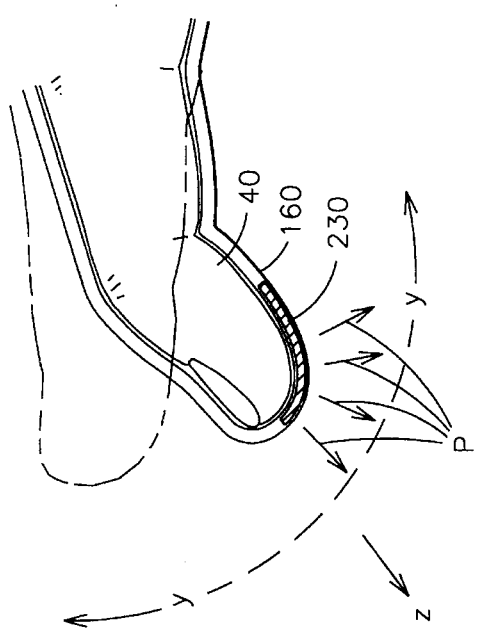
FIG. 9 is a left side elevational view of the finger, illustrating an embodiment with a fingernail aperture formed in the glove.

One advantage of using a three-axis accelerometer device is that if the first direction x is denoted as left and right movement of the finger 40 along a first axis relative to a first direction X along the surface 70, both of the other orthogonal axes of such an accelerometer may be used to sense acceleration in the vertical plane 32 that is orthogonal to X (FIG. 8). While typing, for example, the fingertip 30 of the finger 40 actually moves in an arc on the vertical plane 32 since the fingertip 30 pivots around one or more of the joints of the finger 40 (FIG. 9). As such, motion of the fingertip 30 in the vertical plane 32 may be described as a trigonomic function of orthogonal finger axes y and z in the vertical plane 32, wherein axis y is perpendicular to the finger nail plane 34 and axis z is generally parallel to the finger axis 36. It is assumed that each finger 40 is rotationally fixed around each finger axis 36, so that acceleration of the fingertip 30 along axis x of the finger corresponds to acceleration of the fingertip 30 along the surface axis X. However, in the vertical plane 32, finger axes y and z must be transformed to surface axes Y and Z through trigonometric functions involving an angle $\theta$ of the finger axis 36 relative to the surface 70 (FIG. 8). These axes are illustrated in FIG. 8 wherein finger axis 36 is shown at the angle $\theta$ relative to the surface 70. Under the approximating assumption that the finger 40 does not rotate, planes Y-Z and y-z lie in the vertical plane 32.

Another advantage of using a three-axis accelerometer device is that the third accelerometer axis z may be used as the pressure sensing means 20, in that a rapid deceleration along the z axis may represent the sudden deceleration of the finger 40 against the surface 70. Such a deceleration is far greater than can be achieved manually without actually suddenly decelerating the finger 40 against the surface 70. While such use of the z axis accelerometer is possible and results in less manufacturing expense, it is not as accurate at determining finger pressure against the surface 70 as with a separate pressure sensing means 20.

The second and third axes of such a three-axis accelerometer may be used to sense change in $\theta$ of the fingertip 30 with respect to the surface 70. Acceleration of the fingertip 30 in the Y direction, therefore, is accurately described as $AY = Ay\, SIN(\theta) + Az\, COS(\theta)$.

Such calculated transformation of Ay and Az into AY may be necessary in some embodiments where relatively precise determination of finger position in the Y direction is required. However, in many situations it is sufficient to provide an embodiment of the present invention having only two accelerometers per finger, sensing a first acceleration in the x direction and sensing a second acceleration in a v direction in the vertical plane 32 oriented at an optimal angle $\phi$ (FIG. 8). Angle $\phi$ (FIG. 8) is the mounting angle of the second accelerometer with respect to z. Angle $\alpha$, which is the angle of the second accelerometer with respect to the surface axis Y, is a function of $\theta$ which changes while typing and is calculated as $\alpha = \theta - \phi$. An acceleration Av in direction v can be resolved into $AvCOS(\phi) + AvSIN(\phi)$, and acceleration in Y, that is AY, is approximated by $AvCOS(\alpha)$. Thus, for the range of $\theta$ that is typically used while typing, from approximately 120° on a lowermost row of keys to approximately 30° on an uppermost row of function keys, sensing acceleration in v and substituting same for acceleration in Y may be sufficient, and therefore transforming y and z into Y is not always necessary. Indeed, not having to transform Ay and Az acceleration signals into AY saves a considerable number of otherwise required calculations, computer and sensor hardware, or both. The optimal angle $\phi$ is approximately 75°, the midpoint between 30° and 120°. Using this approximation, the maximum percentage error between AY and Av is $100(1 - COS(\alpha max))$, where $\alpha max$ is the angle furthest away from $\phi$. At both 30° and 120°, this maximum error value is about 29%.

For the purposes of this disclosure, reference letter P denotes the pressure signal from an embodiment with one of the pressure sensing means 20 on only one finger 40. However, in its most practical form, the invention includes at least one pressure sensing means 20 for each finger 40 of each hand 50. As such, there are typically ten pressure signals P, or $P_1$ through $P_{10}$, $P_1$ corresponding to the small finger 40 of the left hand 50 and $P_{10}$ corresponding to the small finger 40 of the right hand 50. As such, $P_n$ represents any arbitrary signal $P_1$ through $P_{10}$. Likewise, $Ax_1$ through $Ax_{10}$ and $Ay_1$ through $Ay_{10}$ represent the first and second acceleration signals from each of the ten fingers 40, respectively. The thumb 45 of each hand 50 is considered a finger 40 like any other finger 40, for the purposes of this disclosure, unless it is specifically referred to as the thumb 45.

For each finger 40, a relaying means 100 (FIG. 1) relays the pressure signal P and the first and second acceleration signals Ax,Ay to the computer 10. Such a relaying means 100 may be as straightforward as a plurality of electrically conductive wires 120 terminating at a coupler 101, as show in FIG. 1. The number of conductive wires 120 may be minimized by using multiplexing methods known in the art and appropriate decoding or de-multiplexing means at computer 10. Alternately, however, since such wires 120 tend to be somewhat cumbersome during use, the relaying means 100 may further include an energy wave transmitter 130 that is electrically connected to the pressure sensing means 20 and each acceleration sensing means 80,90. Such a transmitter 130 sends wave energy, such as light, sound, or radio wave energy, to a wave energy receiver 140 that is electrically interconnected to the computer 10. Relaying coded information via wave energy is well known, and various prior art devices utilize such a wireless relaying means 130.

Figure 7:
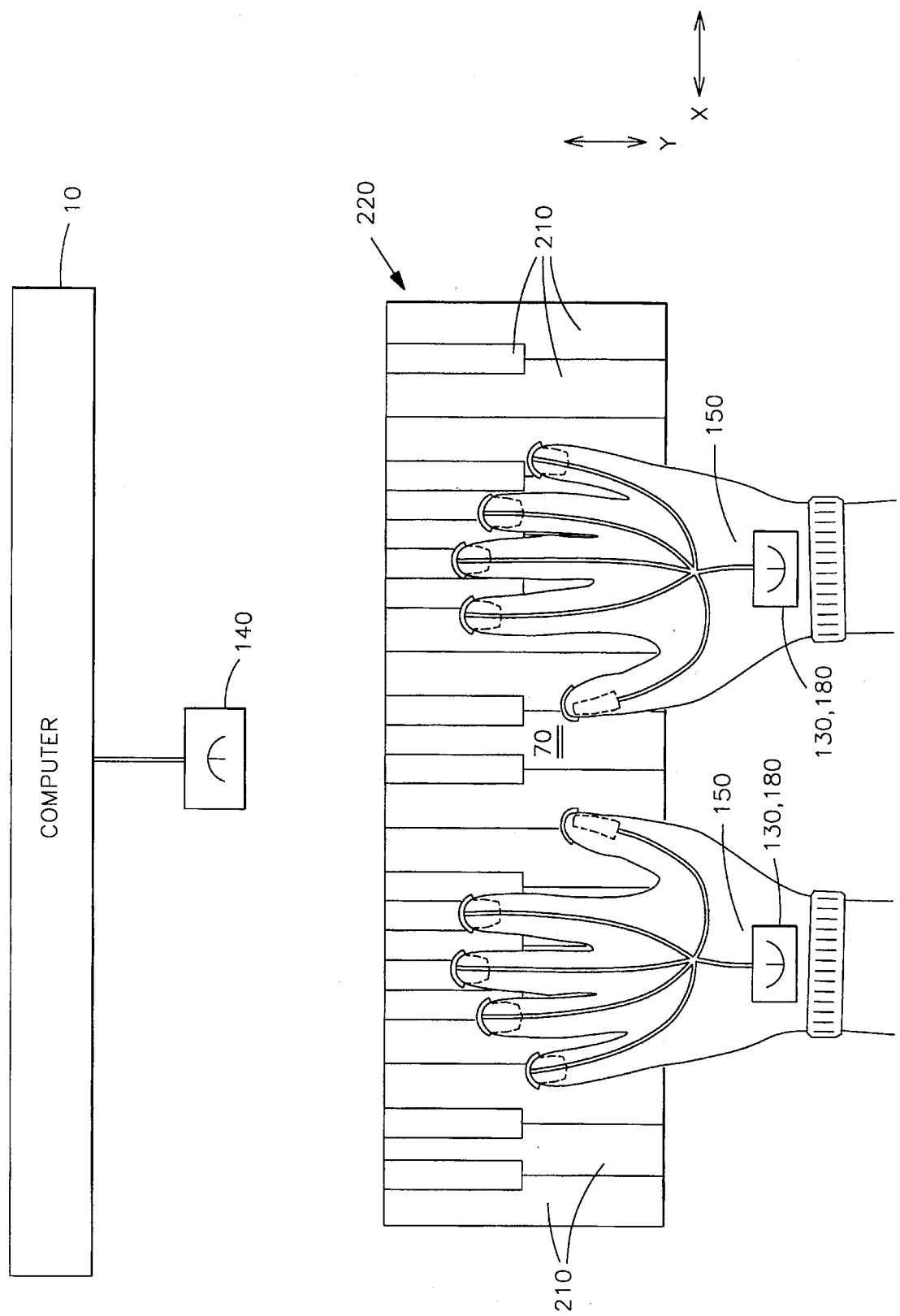
FIG. 7 is a top plan view of the invention, illustrating the device as used in a musical keyboard configuration, and further illustrating a wireless signal relaying means interconnecting each sensor and the computer.

In the embodiment wherein the transmitter 130 sends light waves, the receiver 140 is installed at a position near the computer that is typically in line-of-sight view of the hands of the user, such as on a CRT monitor, a desk top, a wall, or the like. The receiver 140 is preferably a narrow-beam receiver so that cross-talk is prevented between neighboring computers 10. In such an embodiment, the transmitter 130 is preferably removably fixed to the back 150 of the person's hand 50, such as is illustrated in FIG. 7.

In other embodiments wherein the wave energy is either radio or sound, each transmitter 130 and receiver 140 may have a channel selection means (not shown) so that interference between neighboring such devices may be eliminated. Alternatively, however, the transmitter 130 may also transmit a user code for identifying a particular person, such that the computer 10 can disregard any transmitted signals originating from a user that is not currently logged on, or that does not have proper access privileges thereto. In such an embodiment, the receiver 140 may receive several signals from a variety of transmitters 130, but have a tuner or a discriminator (not shown) for eliminating all of the signals not on a particular frequency, for example. Such signals, further, may be encrypted using a variety of real-time encryption techniques so that such wave energy signals, if intercepted by a third party receiver 140, cannot be deciphered without knowing an encryption key programmed in both the receiver 140 and transmitter 130.

The transmitter 130 has the advantage being free of wires 120 extending therefrom. Clearly, however, such a transmitter 130 requires its own self-contained power source, such as a battery (not shown). In order for the instant invention to be comfortably light and easy to use for an extended period of time, however, such a battery must be relatively lightweight, or small. However, smaller batteries tend to have shorter lives. In order to avoid the inconvenience of frequent battery changes, therefore, such a battery may be a rechargeable battery. After use, such as at the end of the day, the user may engage a recharging adapter cord to a power jack (not shown) on the transmitter 130. If the battery of such a transmitter 130 looses its charge while the user is using the device, the power cord may be engaged during use, even though this is slightly awkward.

The pressure sensing means 20, and each acceleration sensing means 80,90 or position sensor 230, may be attached to the fingertip 30 in a variety of different ways. For example, such sensors 20,80,90 may be attached to an individual finger sheath (not shown) made from a flexible, somewhat elastic material, that slips over the finger 40 and remains in place thereon due to its elastic nature and friction fit. In such an embodiment, however, a person using the device on all of his fingers 40 must fit such a sheath on each finger 40, a somewhat cumbersome task.

Figure 6:
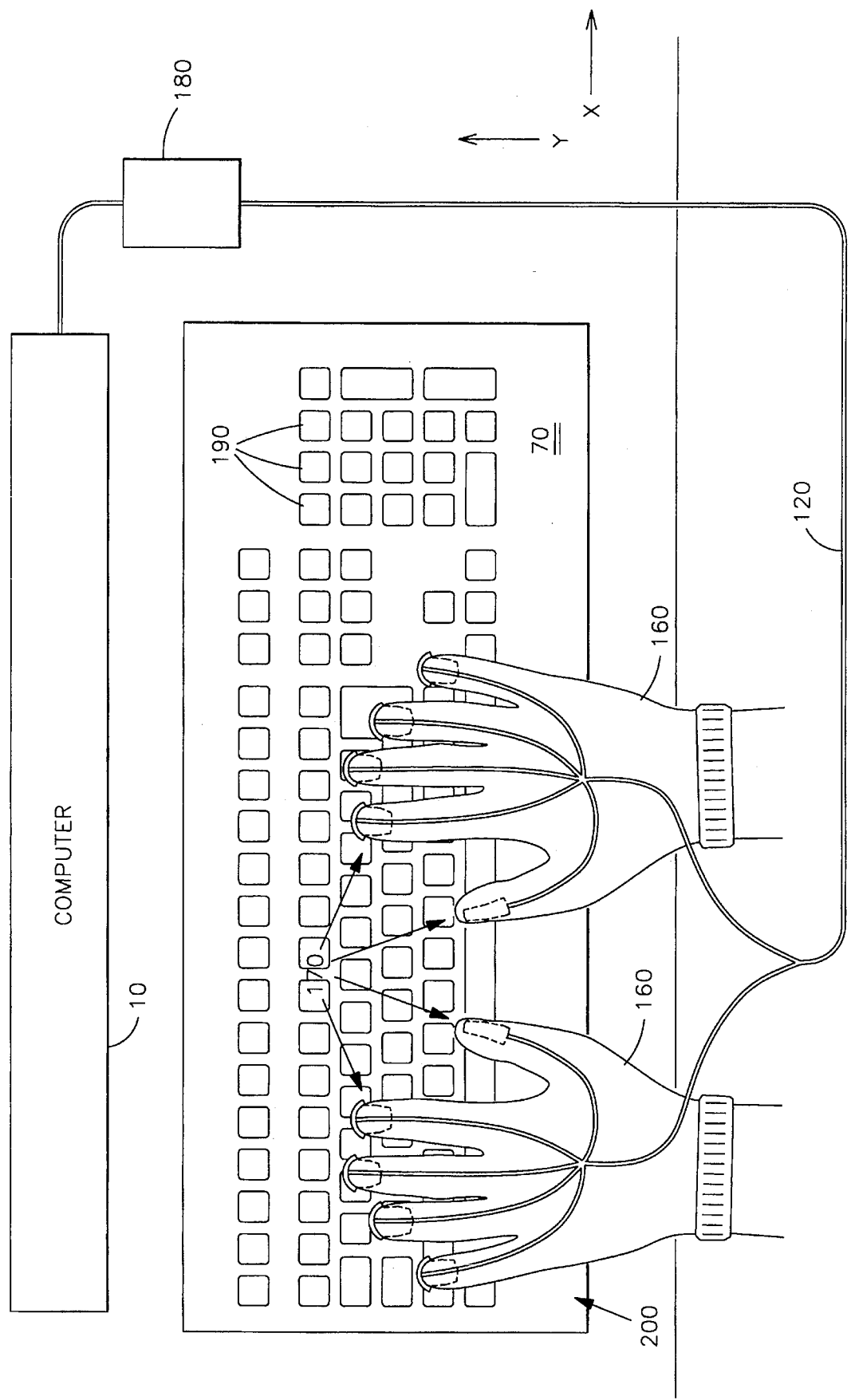
FIG. 6 is a top plan view of the invention, illustrating the device as used in a computer keyboard configuration, and further illustrating a conductive wire-based signal relaying means interconnected between each sensor and the computer.

In the preferred embodiment of the invention, therefore, the sensors 20,80,90 are fixed to fingertip portions 170 of an attachment member 160, such as a flexible glove 160, that at least partially covers each finger 40 (FIGS. 6 and 7). As such, to wear such a device a person needs only to insert his hand 50 into the glove 160 and then correctly position each-fingertip portion 170 of the glove 160 on each finger 40, if necessary. Such a glove 160 provides a suitable location proximate the back 150 of the hand 50 for mounting the signal relaying means 100 and the transmitter 130. The glove 160 is preferably made of a comfortable, flexible, and breathable material, such as LYCRA or cotton fabric, or any other suitable material that is comfortable for a person to wear for an extended period of time. The glove 160 does not need to completely cover the hand 50, and dearly the choice of the material to use for the glove 160 is a matter of personal preference on the part of the user. As such, the sensors 20,80,90 and the transmitter 130 may be made to be easily sewn, adhered, or otherwise attached to a user preferred glove 160. The purpose of the glove 160 is not to cover the hand 50, but to attach, properly position, and align sensors 20,80,90, and transmitter 130, with the hand 50 and fingers 40.

In use, in a first embodiment, the computer 10 receives the pressure signals $P_n$, and the acceleration signals $Ax_n$, $Ay_n$ and stores these in a computer memory means 240, such as a conventional data register. The computer 10 may then calculate surface accelerations $AX_n$, $AY_n$, and, over time, calculate and track velocities and positions 110 above the surface 70 over which each fingertip 30 is positioned. Such positions 110 correspond to at least a portion of the information to be entered into the computer 10.

For example, in the preferred use of the invention, the positions 110 correspond to alpha-numeric key positions 190 on a QWERTY type keyboard 200 (FIG. 6). To establish home key reference positions $R_n$, the user places his fingers 40 on the surface 70 at positions he visualizes as the home row of keys, that is, over the letters "ASDF" for the left hand 50 and "JKL;" for the right hand 50. Both thumbs 45 may be positioned over a "space bar" position. Then the user sends a "reset" indication to the computer 10, such as by simultaneously pressing down on all fingers except the thumbs, for example, or by simultaneously pressing both thumbs 45 down. Pressing the is fingers 40 down in this fashion increases the pressure signals $P_n$. The computer 10 may provide an audible or visual indication that it has received the "reset" command, such as by sending a short beep to a speaker, or the like.

Figure 14:
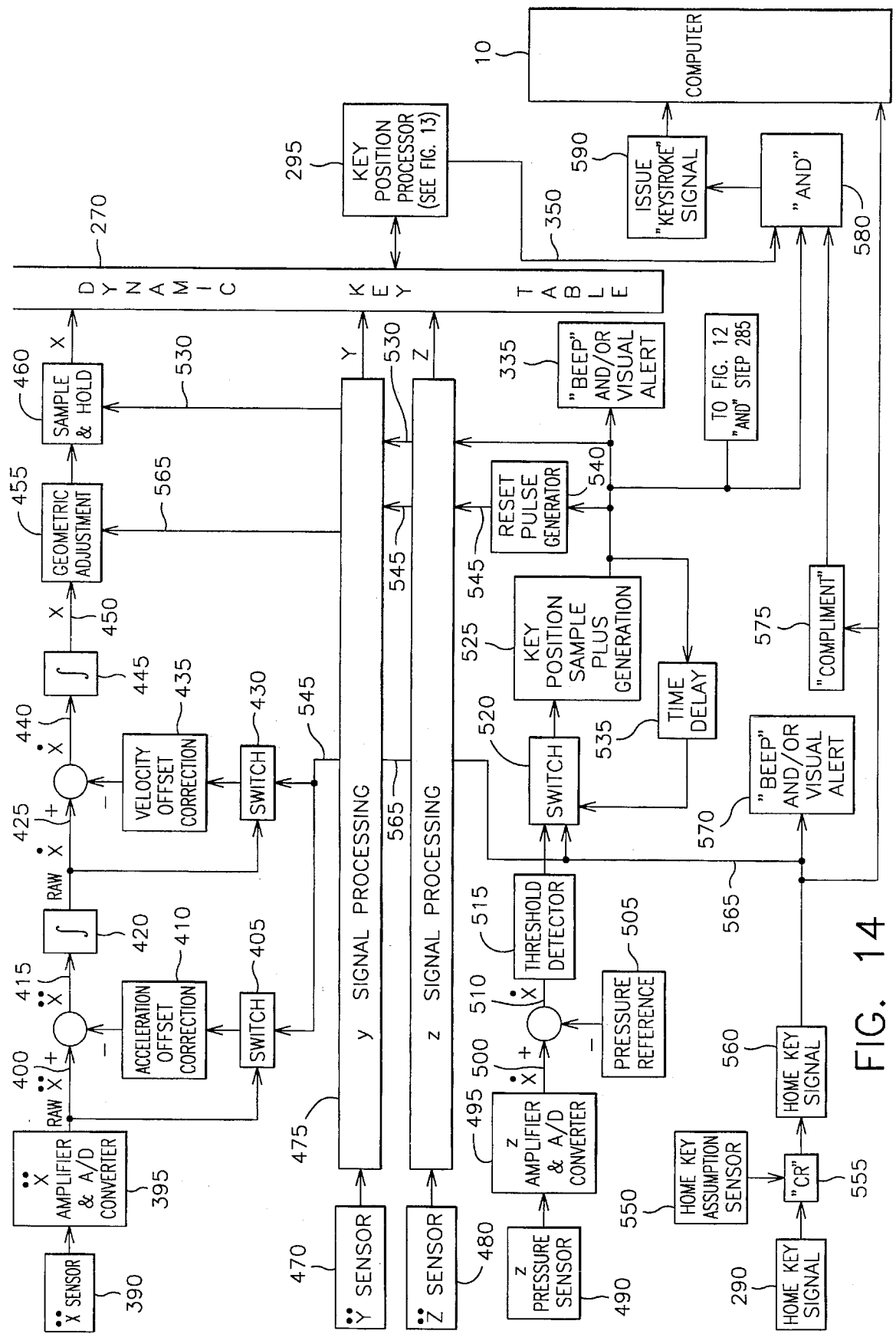
FIG. 14 is a functional diagram of the detailed electronic and software signal processing steps of the sensor signals of a single finger.

At this point, with each finger 40 on the reference position $R_n$ and stationary, the acceleration signals $Ax_n$, $Ay_n$ are essentially zero, or otherwise indicative of zero acceleration in any direction. By way of example, if the right index finger begins to move forward in the Y direction with respect to the surface 70, the second acceleration sensing means 90 on that finger will indicate such, and $Ay_6$ will increase. By integrating this signal over time the computer 10 can calculate velocity of the finger 40 in the Y direction, and by integrating the velocity of the finger 40 over time the computer 10 can determine the distance traveled by the finger 40 away from the reference position in the Y direction. Likewise, for motion of the finger 40 in the X direction, the x axis accelerometer 80 is twice integrated to determine the distance traveled by the finger 40 in the X direction (FIG. 14). In this manner, the position of the finger 40 over the X,Y plane of surface 70 can be readily determined. If the pressure signal $P_6$ for that finger 40 then rises above a predetermined threshold value, the computer 10 determines what key position 190 corresponds to the distance traveled in both the X and Y directions and accepts the corresponding "virtual" alpha-numeric key as having been "pressed," that is, selected by the user. In this manner, all fingers 40 are tracked, and selected key positions are used as conventional input from the keyboard 200.

It is recognized that practical accelerometers may have measurable output offset voltages that, if integrated, result in velocity errors that, when further integrated, result in position errors. Methods commonly used to compensate for these offsets may include, but are not limited to, using threshold values below which any accelerometer signal is considered to be zero, using feedback control systems, for example, to measure and nullify said offset voltages, or both. Likewise, accumulating errors can be discarded by resetting the finger position to the reference position $R_n$ upon return of each finger 40 to the home key location, be detecting a user-sent "reset" signal, or by measuring a predetermined time interval since each finger 40 has been used, after which it is assumed that the finger 40 has returned to the reference position $R_n$. Use of such methods to compensate for accelerometer offsets are within the scope of this invention.

Clearly the QWERTY type keyboard 200 is not a required layout, although most typists are familiar with the QWERTY key layout. However, a considerable advantage of the present invention is that any other keyboard layout may be readily used by software mapping any key combination to the key positions 190. Other, more efficient keyboard layouts have been developed, but most conventional keyboards have the corresponding QWERTY keys permanently imprinted or molded onto each key, and therefore such keyboards 200 cannot readily be switched to a different layout. With the present invention, a printed paper or fabric keyboard template (not shown) may be adhered to or set upon the surface 70 for the user to refer to as a guide for key positions. Such templates, especially if made of paper or cling vinyl, are light-weight and extremely inexpensive to produce and use, and may be folded or rolled-up for portability.

Figure 11:
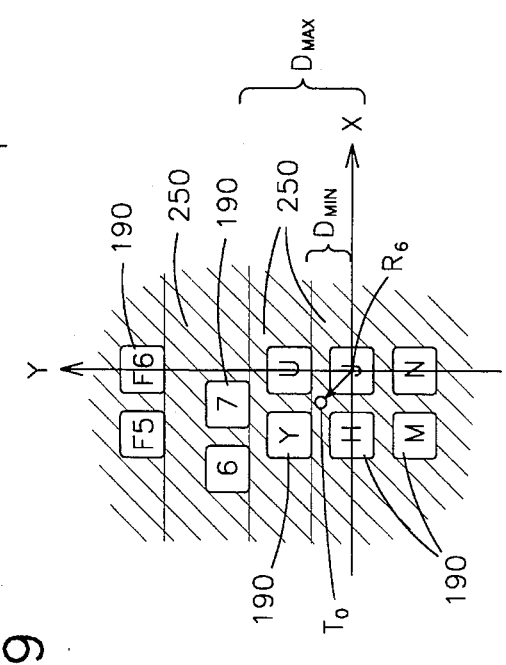
FIG. 11 is a diagram of virtual keyboard positions for a right index finger, illustrating a reference "home" position at coordinate 0,0.

Another considerable advantage of the present invention is that the "virtual" keyboard for each user may be different depending upon the preference of each user. For example, while one user with relatively large hands 50 may move his right index finger 40 two centimeters from the reference position $R_6$ in order to select the letter "U," another user with smaller hands 50 may only move his finger 40 one centimeter to select the same letter. The present invention can accommodate either of these since the selected letter is not determined by the physical location of a key but, instead, is a software-derived function that depends upon modifiable software parameters. A software register in the memory means 240, for example, stores the minimum distance Dmin between the reference position $R_6$ and the next row of key positions 190 (FIG. 11). But this distance Dmin can be set to any arbitrary value, providing that it does not cause key positions to overlap.

Just as use of the standard QWERTY key designations are not required with the present invention, the standard rectangular coordinate, equally-spaced key location grid is also not required. For example, a user's most comfortable and least error-causing grid may be a non-linear curved coordinate system (now shown). Such a custom, spatial keyboard configuration may have a three dimensional non-linear surface 70.

The present invention may be initially calibrated for each user by displaying a letter on a display of the computer 10, waiting for the user to select a key location 190, storing the resulting finger position as an initial position for that letter, and then repeating the process for each other letter. The distance between each letter can be equally split to produce a grid wherein any selected finger position will correspond to a nearest key location 190. Alternatively, an ambiguous zone 250 may be defined such that, if a selected finger position $T_0$ is within the ambiguous zone 250 the computer 10 will beep or otherwise signal the user to re-select the undetermined key location 190 (FIG. 11). When the user then re-selects the desired key location 190, the computer 10 can then use the original ambiguous position $T_0$ to adjust the software parameters such that the desired key position 190 will be selected upon subsequent selected finger positions of $T_0$. This artificial intelligence method of "learning" the desired values for many of the different control parameters ensures that, after a calibration period, the computer 10 recognizes the typing style of the user and results in fewer errors. Indeed, since these control parameters may be for the most part running averages, the computer 10 can change the virtual key locations 190 as a person's typing style changes, such as when the person becomes fatigued over time. Further, the computer 10 may determine that the person's typing style in the morning hours is, on average, different than his typing style in the afternoon hours, and change the parameters according to the time of day. Further, these user parameters may be stored and saved, and a user may develop various sets of parameters, such as a set for desk work, a set for cramped airplane center-seat use, a set for easy chair use, and the like.

Figure 13:
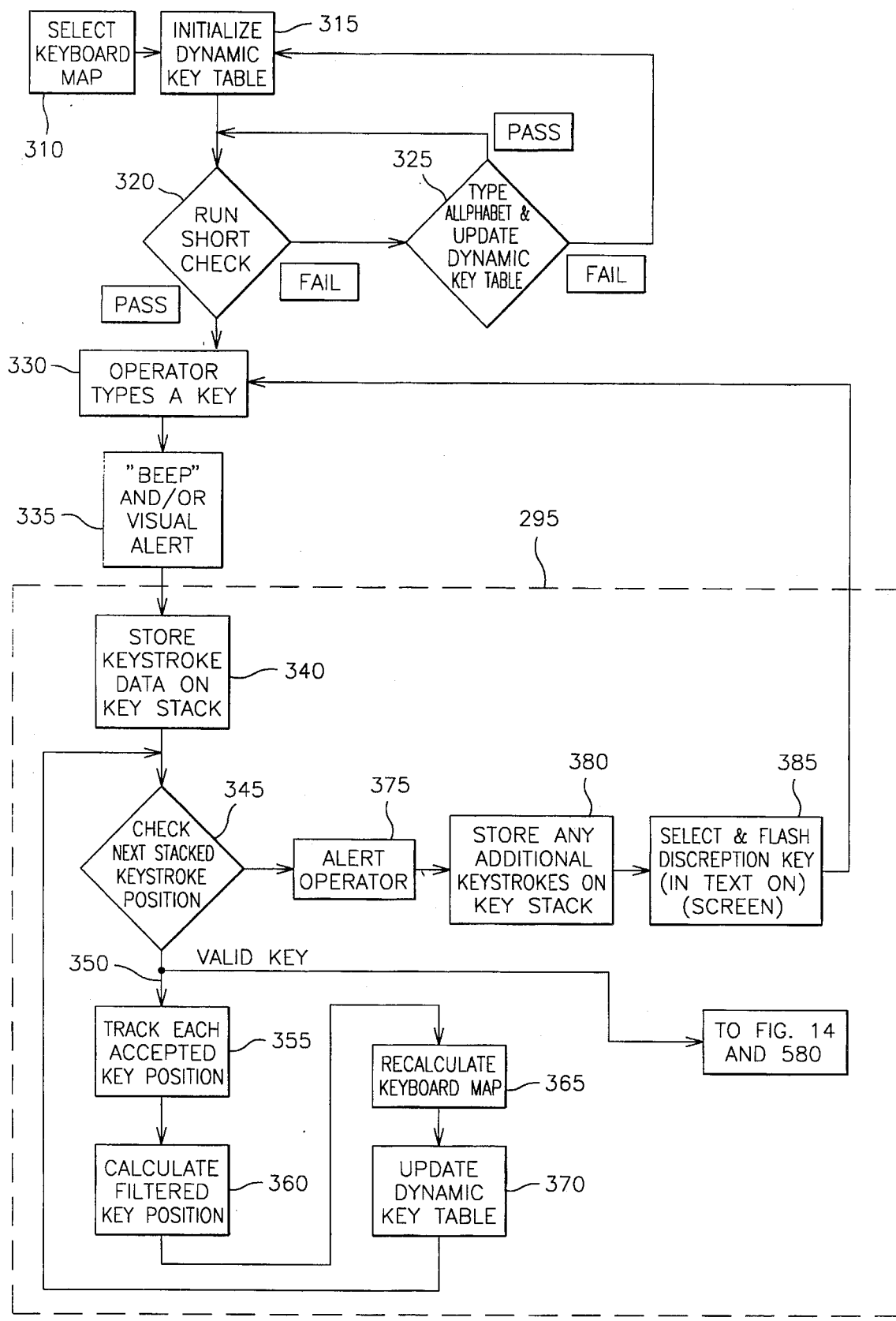
FIG. 13 is a flow diagram of steps taken by the invention in response to typing by the hand.

One of the most common drawbacks of using a conventional computer or typewriter keyboard 200 is that when a mistake is made, such as a "Y" being pressed instead of a "U," it is usually several keystrokes later that one realizes the mistake has been made, or much later during the inefficient process of editing. Often the person's fingers 40 are already typing the next few letters when the person realizes that a mistake has been made. This results in the person necessarily pressing the "delete" key a number of times so as to move the current typing position, or computer cursor, back to the incorrect letter, re-typing the mistaken letter, and then re-typing the correct letters that had been deleted. A considerable and unexpected advantage of the present invention is that the computer 10 can, upon determining that a key position is ambiguous, send a signal to the user such as a beep, accept the next few letters, and automatically place the cursor over the ambiguous letter at the next operator pause (FIG. 13). The user, after he has stopped typing and has realized that a mistake was made, simply re-selects the desired key position 190, whereupon the computer 10 then repositions the cursor after the last letter of said "next few letters" typed so that the user may continue typing from his last correct letter. As such, the user is not required to employ delete, forward-delete, cursor control, or X,Y mouse signals. Typing speed and precision increases for such users.

A pre-processing means 180, such as a stand-alone pre-processor (FIG. 8), may be included in the relaying means 100 for receiving as input each pressure signal $P_n$ and each acceleration signal $Ax_n, Ay_n$, processing each signal $P_n, Ax_n, AX_n$, as indicated above, and delivering as output to the computer 10 a keyboard output signal K. As such, each position 110 corresponds to a key position 190 on a keyboard 200. Similarly, the pre-processing means 180 may deliver as output to the computer 10 an X,Y mouse position signal, an X,Y graphic tablet signal, or an X,Y track ball signal. Alternately, the pre-processing means 180 may deliver as output to the computer 10 a musical keyboard output signal (FIG. 7). In such an embodiment, each position 110 corresponds to a musical key position 210 on a musical instrument keyboard 220, such as that of a piano, or the like.

One advantage of including such a pre-processing means 180, which essentially comprises a separate, dedicated pre-processing computer (not shown) having its own memory, is that the computer 10 is then relieved from the burden of having to calculate and track each finger position. Some computers 10 may not have the speed or memory necessary to accomplish these calculations without compromising their performance. Essentially, the pre-processing means 180 allows the present invention to accurately resemble the conventional computer keyboard 200, in one embodiment, and as such the output of the pre-processing means 180 may be directed into a keyboard port of the computer 10. The pre-processing means 180 also allows the instant invention to produce the X,Y mouse position signal, such as when the right hand 50 moves far enough away from the right-most key position 190 so as to clearly indicate that the right hand 50 has moved away from the virtual keyboard. Averaging all five $x_{6,7,8,9,10}$ direction values provides a right-hand X location value. Similarly, averaging all five $y_{6,7,8,9,10}$ direction values provides a right-hand Y location value. Such X,Y mouse position signals may then be directed into a mouse port of the computer 10. Indeed, the pre-processing means 180 may have both the keyboard and X,Y mouse position outputs, such that special "peripheral driver" software does not have to be loaded into the computer 10 to use the device of the present invention. The pre-processing means 180 may be included in an enclosure of the transmitting means 130 such that only the selected key information needs to be transmitted to the receiving means 140. As such, the transmission speeds and complexity of the transmitter 130 and the receiver 140 can be minimized.

The pre-processing means 180 can be provided with additional memory such that typing may be performed without computer 10, such as for rough-draft creation using only the present invention, for example, while sitting in a barber's chair, or while otherwise away from the computer 10. As such, entry of the typed information into the computer 10 may be accomplished at a later time upon subsequent connection of the pre-processing means 180 to the computer 10.

Figure 12:
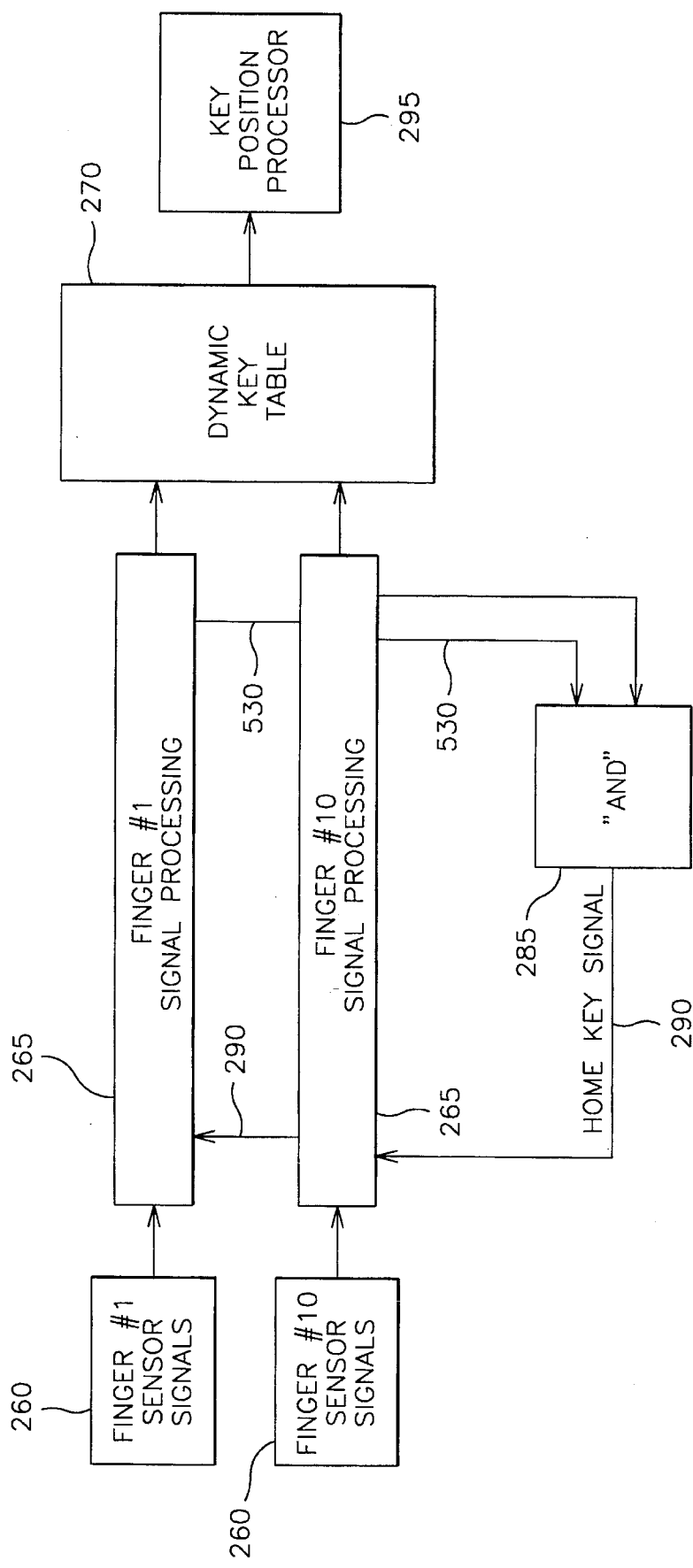
FIG. 12 is a system block diagram of a preferred embodiment of electronic and software signal processing steps of the sensor signals for both hands.

In reference now to FIG. 12, sensor signals 260 from each finger 40 are coupled to a signal processing function 265, which provide position information to a dynamic key table 270. A signal processing output 530 associated with each finger 40 is indicative of a finger key pressing event, and is combined in an "AND" function 285 to indicate, in one method, that all fingers 40 have been reset to the home key reference position $R_n$. Alternatively, select finger signal processing outputs 530, such as those from all fingers 40 but thumbs 45, are coupled to "AND" function 285. In this way, signal 290 is indicative of an operator statement that his fingers 40 are located on the home key reference positions $R_{1-10}$ for updating position references thereto.

The dynamic key table 270 is coupled to key position processor 295. FIG. 13 illustrates the key position processor 295 functioning, as well as system initialization and keystroke responses. A select keyboard map 310 selects a predetermined mapping of the keyboard in response to computer or operator decisions regarding the initial keyboard characteristics at the beginning of a typing session. Alternatives may include default keyboard layouts in an orthogonal grid system, non-linear keyboard maps in which the home key row is actually a curve found to improve comfort or adapted to an operator, compressed keyboard maps for airplane travel, memorized dynamic keyboard table maps for certain individuals, or others, including various keyboard layouts such as the Devorak lettering scheme, or the like.

The keyboard map 310 is used to initialize the dynamic key table in function 315 of FIG. 13. Then in short calibration step 320, a short check may be performed to familiarize the operator with the system and familiarize the system with the operator. This short check may include having the operator type one sentence, for example, or the operator's name. If this test fails, such as if a predetermined number of keystroke positions are in the ambiguous zone 250 in the dynamic key table 270, the operator may be requested to type an abbreviated alphabet in full calibration step 325, or the full alphabet, in order to further check the operator against the initialized dynamic key table. If a predetermined number of key presses pass, the program flow follows again into the short calibration step 320. However, if a predetermined number of key presses fail in full calibration step 325, the program flow goes back to function 315 and updates the dynamic key table 270 to the current operator characteristics.

After the calibration step 320 is successfully accomplished, the operator may then begins to type desired information into the computer 10. In input step 330 the operator types a key. In alert step 335 the system may provide a feedback "beep" sound, a visual alert such as a graphic representation of the key being pressed, or the like. The key position processor 295 then analyzes each of the keystrokes of the operator. In stack 340 the keystroke data is stored on a key stack memory, which serves as a chronological register or list of the sequential key strokes of the operator.

In step 345 the system draws the next unprocessed keystroke data from the key stack, such as the data for the letter "K," and checks its position in the dynamic key table 270. In response to a passing test, a "valid key" signal 350 is generated. Following this, in steps 355, 360, 365, and 370 the process keeps track of each occurrence of each accepted key position, calculates a filtered key-position, such as a weighted running average of each key location over the past, for example, 5 keystrokes for the letter "K," and calculates a new keyboard map to update all keyboard mapping parameters that might be affected by a change in the instant key filtered key-position. Such updating might be necessary, for example, if the operator is becoming tired, shifts his seating or hand positions, if sensor characteristics change slightly, or the like.

If an error condition is detected in step 345, such as if the typed character position does not lie within the tolerance limits for the instant key in the dynamic key table 270, the operator may be alerted in some fashion in step 375, such as with an audible "beep", visual display, or the like. Then the system may store any coasting keyboard strokes, such as keystrokes taken by the operator before the error condition registers in the mind of the operator and typing stops, on an error condition key stack (not shown). Then in step 385 the discrepant key may be flashed on the monitor, illuminated bright, underlined, boxed, colored, or otherwise flagged, to allow the operator to simply re-type the character in input step 330 without repositioning a screen cursor manually. This saves time in backspacing, mouse, or direction-key manipulations. Control then flows through steps 335, 340, and 345, after repositioning the cursor if necessary, to examine and process the next keystroke.

Referring now to FIG. 14, the first and second derivatives of position, that is, velocity and acceleration, are shown as:

$\ddot{x}$=acceleration in x
$\dot{x}$=velocity in x
$\ddot{y}$=acceleration in y
$\ddot{z}$=acceleration in z FIG. 14 is a functional block diagram for all axes of the sensors of one finger 40 as interfaced with the dynamic key table 270 and culminating in the issuance of a "keystroke" signal in step 590 to the computer 10. Four sensors, namely x acceleration sensor 390, y acceleration sensor 470, z acceleration sensor 480, and z pressure sensor 490, are shown at the left of FIG. 14. It should be understood that this diagram is general in that three acceleration axes are illustrated. An alternate simplified embodiment involves a 'v' acceleration sensor that is oriented at an angle of $\phi$ from the y axis and has been described previously as the two-acceleration axis embodiment. In FIG. 14 of such a two-acceleration axis embodiment, y acceleration sensor 470 can be renamed v acceleration sensor 470, and z acceleration sensor 480 can be eliminated. The output then of the v signal processor 475 is used as an approximation for position Y relative to surface 70 previously described.

The signal from z pressure sensor 490 is amplified and converted into a digital format in 495 to provide a raw digital z pressure signal 500. A predetermined or adaptive pressure reference 505, that is, adaptive in that it adjusts for temperature variations, for example, is subtracted from the raw pressure signal 490 to provide the relative pressure signal 510. Pressure reference 505 may, for example, be set to the value of the raw digital pressure signal 500 at times when it is known that no virtual keys are being depressed. Pressure signal 510 is threshold detected in 515 and transferred through switch 520 to key position sample pulse generator 525. Time delay 535 and switch 520 insure against multiple key position sample pulses 530, inhibiting multiple pulses occurring more often than intentionally possible with any single finger 40 of a fast typist.

The key position sample pulse 530 is then directed to the signal processor sample & hold circuits 460 to transfer the then-existing X, Y, and Z finger tip positions associated with the time of occurrence of the pressure pulse that exceeded the pressure threshold in 515. After a short time, for example, 100 microseconds later, after the key position sample pulse 530 transfers the position data to dynamic key table 270, reset pulse generator 540 issues a reset pulse 545 to reset integrators in the signal processors. Additionally, key position sample pulse 530 signals to the operator in 335 that a key has been pressed. A "keystroke" signal is issued in 590 and is directed to computer 10 in response to "AND" gate 580 which insures only valid keystrokes are issued and that such keystrokes, when associated with home key reset signals, are not transmitted as "keystroke" signals to the computer. The output of 575 is a signal indicating that the current key position sample pulse 530 is not due to a home key reset condition.

Beep and/or visual alert 335 may be characteristic of the particular finger 40 or keyboard row, may be generated in computer 10, and may include a flashing, colored, boxed, or otherwise flagged illustration of a key board displayed on the monitor, to provide operator feedback within direct line-of-sight. Such display can include hand and finger drawings or symbols to provide additional feedback from the screen.

Home key reset signal 290 is combined with a signal from home key assumption logic 550 in an "OR" function 555 to produce in step 560 a home key reset signal 565. All ten finger signal processors are reset in response to home key signal 290, whereas only effected finger home keys are reset in response to the local home key assumption logic 550. Home key assumption logic 550 may include, but is not limited to, timing measurements, not shown, to indicate that a particular finger has not pressed a key in some time, and it may be assumed that the finger has moved to its home key reference position. Vertical position information "Z" may be utilized to help in this determination in applications requiring high precision finger location. Other home key assumption logic may include cross-axis factors, other-finger correlation factors, full hand motion corrections, and other methods to improve precision of location determination in critical applications such as needed for very large and complex keyboards, or for very slow typists.

"Beep" and/or visual alert 570 may be a flashing indicator upon a displayed keyboard. For this reason 565 may also be coupled to computer 10. This alert may have unique characteristics to identify to the typist the home key reset method used. Home key reset signal 565 is coupled also to geometric adjustment functions in step 455 to identify when finger positions correspond to home key positions.

FIG. 14 further illustrates the signal processing of the accelerometer signals. x acceleration sensor 390 is connected to amplifier and A/D converter 395 for providing a raw digital x acceleration signal 400. When the finger 40 is at rest following a keystroke, a reset pulse 545 is received and switch 405 saves a copy of the digital x acceleration signal 400 with finger at rest, and saves this acceleration offset value as acceleration offset correction 410. Offset 410 is subtracted from 400 to provide x acceleration signal 415. Acceleration signal 415 is integrated in integrator 420 for providing a raw x velocity signal 425. Switch 430 saves a copy of the raw x velocity 425 with finger 40 at rest in response to reset pulse 545, creating a velocity offset correction 435. The velocity offset correction is subtracted from the raw x velocity 425 to create x velocity 440. The velocity signal 440 is integrated in integrator 445 to provide x position 450 which is the x position of the finger 40 with respect to its previous key location. Geometric adjustment 455 operating upon x position 450 subtracts the previous key x location in order to generate an x position relative to the home key location, and then transforms the resulting x position in the finger coordinate system into the X location in the surface 70 coordinate system described previously. Geometric adjustment 455 may also include linearity corrections, cross-axis corrections, roll compensations, inter-finger correction adjustments, hand motion adjustments, or others as necessary for applications requiring high precision fingertip 30 position values. The output of geometric adjustment 455 is X position in the surface 70 coordinate system.

Sample and hold step 460, in response to key position sample pulse 530, transfers a copy of the X position into an input register of the dynamic key table 270 as the variable "X" at the time of the keystroke pressure detection in 515. In like manner, y sensor 470 and z sensor 480 along with y signal processing 475 function and z signal processing 485 function provide variables "Y" and "Z" to dynamic key table 270.

The demarcation of computer 10 boundaries is flexible, and as previously discussed, a pre-processor 180 may be used to reduce the demands on the computer 10 and perform all tasks associated with FIGS. 12, 13, and 14. Conversely, computer 10 can be used to perform key position processor 295 functions, or even the finger signal processing steps 400 through 460, 475, 485, and 500 through 590, for example.

While the invention has been described with reference to several preferred embodiments, it is to be clearly understood by those skilled in the art that the invention is not limited thereto. Rather, the scope of the invention is to be interpreted only in conjunction with the appended claims.

What is claimed is:

1. A device for manually entering information into a computer, comprising:
   pressure sensing means attachable proximate to the tip of a finger of a hand for generating a pressure signal corresponding to the pressure of the finger tip against a surface;
   position sensing means attachable proximate to the finger tip for generating a finger tip position signal corresponding to the position of the finger top over a surface relative to a reference position, said position sensing means further comprising:
   first acceleration sensing means attachable proximate to the finger tip for generating a first acceleration signal, the first acceleration signal being a function of the acceleration of the finger tip along a first axis;
   second acceleration sensing means attachable proximate to the finger tip for generating a second acceleration signal, the second acceleration signal being a function of the acceleration of the finger tip along a second axis, the second axis being different than the first axis; and
   means for relaying the pressure and first and second acceleration signals to the computer sufficient for the computer to calculate a position on the surface where the finger makes contact, said position corresponding to at least a portion of the information to be used by the computer.

2. The device of claim 1 wherein the second axis is orthogonal to the first axis.

3. The device of claim 1 wherein the means for relaying comprises a plurality of electrically conductive wires.

4. The device of claim 3 wherein the means for relaying further includes an energy wave transmitter electrically connected to the pressure sensing means and each acceleration sensing means, and an energy wave receiver electrically interconnected to the computer.

5. The device of claim 4 wherein the energy waves are light waves.

6. The device of claim 4 wherein the energy waves are sound waves.

7. The device of claim 4 wherein the energy waves are radio waves.

8. The device of claim 4 wherein the energy wave transmitter is attachable proximate to the back of the hand.

9. The device of claim 1 wherein:
   said pressure sensing means are attachable proximate to a tip of at least one finger;
   said first acceleration sensing means are attachable proximate to the tip of at least one finger;
   said second acceleration sensing means are attachable proximate to the tip of at least one finger said means for relaying pressure and accelerations signals configured to facilitate computer calculation of positions on the surface where each finger makes contact, said positions corresponding to at least a portion of the information to the used by the computer.

10. The device of claim 9 further including a flexible glove at least partially covering the hand, the pressure sensing means and the first and second acceleration sensing means attachable to the glove at fingertip portions thereof, and at least a portion of the means for relaying being fixed to the glove.

11. The device of claim 10 wherein the means for relaying further includes decoding means for receiving as input each pressure signal and each acceleration signal, for processing each signal, and for delivering as output to the computer a keyboard output signal, said positions on the surface corresponding to key positions on a keyboard.

12. The device of claim 10 wherein the means for relaying further includes decoding means for receiving as input each pressure signal and each acceleration signal, processing each signal, and delivering as output to the computer a musical keyboard output signal, said positions on the surface corresponding to key positions on a musical instrument keyboard.

13. The device of claim 1 wherein the pressure sensing means and the first and second acceleration sensing means are enclosed in a sensor housing.

14. A method of entering information into a computer, comprising the steps of:
   (i) providing pressure sensing means proximate to the tip of a finger of a hand for generating a pressure signal corresponding to the pressure of the tip of the finger against a surface;
   (ii) providing first acceleration sensing means proximate to the tip of the finger for generating a first acceleration signal, said first acceleration signal being a function of the acceleration of the finger tip in a first direction;
   (iii) providing second acceleration sensing means proximate to the tip of the finger for generating a second acceleration signal, said second acceleration signal being a function of the acceleration of the finger in a second direction, the second direction being different from the first direction;
   (iv) providing a means for relaying the pressure signal and the first and second acceleration signals to a computer memory means;
   (v) establishing a reference position for the finger;
   (vi) storing the pressure signals and the first and second acceleration signals in the computer memory means;
   (vii) determining finger position when the pressure signals reach a predetermined level by integrating the preceding first and second acceleration signals to obtain first and second velocity signals, and then integrating the first and second velocity signals.

15. The method of claim 14 wherein the step of (vii) determining finger position includes:
   (vii-a) maintaining in the computer memory means a position register for each finger for holding the calculated position of each finger based primarily on the twice integrated acceleration signals of each finger;
   (vii-b) mapping each position with one key of a computer keyboard; and (vii-c) waiting until one of the pressure signals exceeds a predetermined value corresponding to pressing one of the fingers against the surface;

and further including the step of (viii) sending a signal corresponding to the one key to a keyboard input of the computer.

16. The method of claim 14 wherein;

the step of (vii) determining finger position instead comprises the steps of (vii) maintaining in the computer memory means a velocity register for at least one finger for holding the calculated velocity in the two directions of the at least one finger based on the once integrated acceleration signals of the at least one finger in each direction;

and further including the step of (viii) sending a signal corresponding to the position of the at least one finger to a mouse input of the computer.

* * * * *